April 3, 1951     E. DEL BUTTERO     2,546,983
CONTAINER

Filed Aug. 13, 1946     3 Sheets-Sheet 1

INVENTOR.
ENZO DEL BUTTERO
BY Richards & Geier
ATTORNEYS

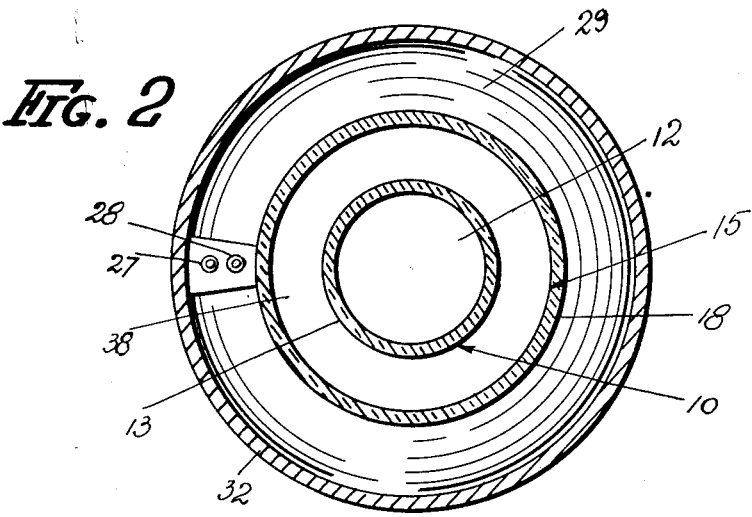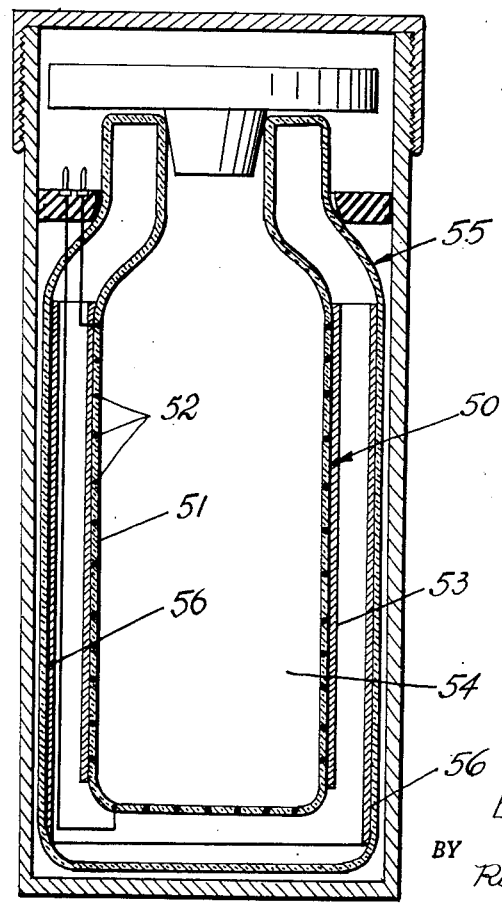

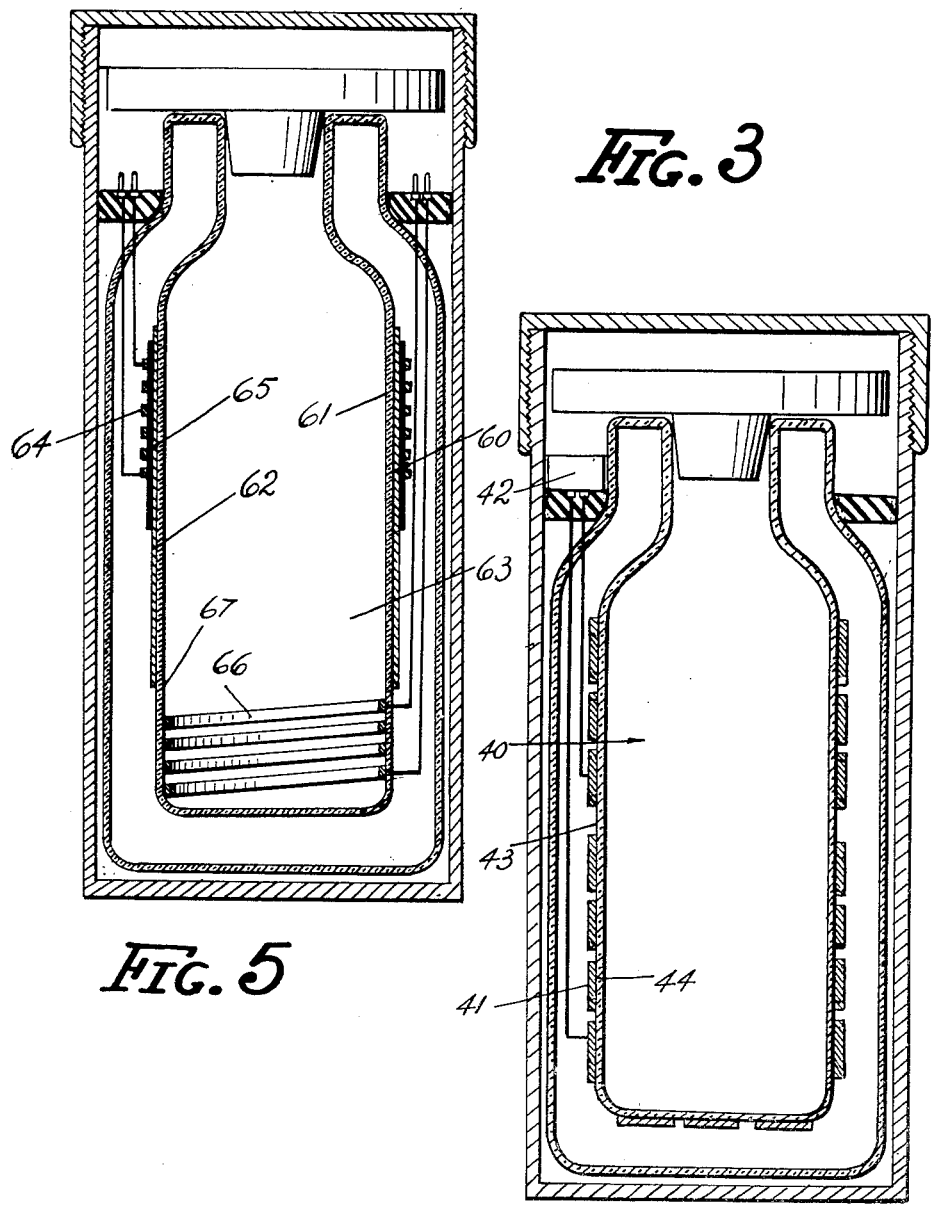

Patented Apr. 3, 1951

2,546,983

UNITED STATES PATENT OFFICE 2,546,983

CONTAINER

Enzo del Buttero, Milano, Italy, assignor to Manufactures des Glaces et Produits Chimiques de St. Gobain Chauny & Cirey, Paris, France, a corporation of France Application August 13, 1946, Serial No. 690,106
In Italy August 13, 1945

2 Claims. (Cl. 219—44)

This invention relates to containers and refers more particularly to bottles, flasks or similar receptacles made of glass, porcelain, earthenware and the like and provided with double walls, as well as electrical means for heating the containers and for preserving the heat stored therein.

The present invention is concerned with improvements in so-called "Thermos" bottles, or heat insulated containers, having double walls and surfaces which reflect toward the interior of the container, as well as toward the exterior thereof. These containers are in general use for preserving beverages and liquid or semi-liquid condiments at temperatures different from those of the atmosphere. Furthermore, vacuum is usually provided between the double walls of such containers. These containers provide excellent protection against loss of heat by radiation and by convection and also good protection against losses due to conduction, so that substances stored therein preserve their temperatures for a long time.

The drawback of such containers is that they are not self-sufficient, in that it is necessary to heat elsewhere the substance to be preserved therein and then pour it into the heat preserving container. This transfer of a hot liquid from one container to another invariably results in a substantial loss of heat, this loss being much greater than that taking place during many hours of preserving the liquid in the thermically insulated receptacle.

It is, therefore, an object of the present invention to provide heat insulating receptacles which can be used not only for the preservation of substances at temperatures different from those of the atmosphere, but also for bringing these substances to the required temperatures.

Another object is the provision of receptacles which prevent heat loss and which can be also used for the heating of substances contained therein.

A further object is to reduce the costs of preserving substances at predetermined temperatures by combining the heat preserving device and the heating device into a single apparatus.

Yet another object is to produce heat insulating containers which, while providing uniform protection against heat losses, can be also used directly as means for the heating of substances contained therein.

Other objects of the present invention will become apparent in the course of the following specification.

U. S. Patent No. 2,119,680 of June 7, 1938, describes the creation of electrical heating means by the deposition of metal particles in the form of a band or strip upon the surfaces to be heated. Containers made of glass, porcelain, earthenware or similar substances, particularly utensils and dishes for kitchen use and for the dining room table, may be provided with such continuous metallic bands constituting electrical resistances and used for the heating of the contents of these containers. The bands are preferably applied to the outer surfaces of the containers, so that they will not contact the substances to be heated or warmed up. Of course, the resistance can be also applied to the inner surfaces of such containers, but then care must be taken that the substances placed therein should be non-conductors of electricity. Furthermore, the resistance can be placed in grooves or recesses provided in the walls of the containers, instead of being applied directly to the outer surfaces thereof.

In accordance with the present invention, the heating means and the heat preserving means are combined by providing double walls in containers of the above mentioned type, particularly in containers made of glass, thereby forming an intermediate space which affords adequate protection against heat losses.

The heat losses are further reduced by making the intermediate surfaces reflecting in such manner that the reflecting surfaces of the inner walls are directed toward the interior of the container and the reflecting surfaces of the outer walls are directed toward the exterior of the container.

Protection against heat losses will be more effective if vacuum is provided in the intermediate space of the double containers, in which case all the advantages of heat preserving containers will be maintained and the further advantage will be added that the device can function at the same time as heating means.

As far as the reflecting surfaces are concerned, it should be noted that the surface of the heating strip constituting the resistance, when applied to glass in the above described manner, has a reflecting quality. Furthermore, in actual practice this strip covers a considerable part of the total surfaces of the side walls. It is possible to substantially enlarge the heating band so that it will cover a larger percentage of the wall surface without changing its electro-thermic effect, by varying conveniently the factors upon which the value of the resistance depends, namely, the grain as well as the thickness of the band. Thus one of the surfaces of the container may be made reflectant solely by the deposition of the electrical resistance thereon. Furthermore, in that case the light reflecting surfaces may be directed toward the interior of the receptacle, i. e. in the direction which is required for the proper functioning of a light reflecting layer.

In accordance with a modified form of the inventive idea, reflecting surfaces may be formed by silvering one of the surfaces of the receptacle in its entirety, then providing an insulating varnish thereon and finally applying the electrothermic strip upon the varnish.

The same effects are attained if, instead of providing the resistance upon the outer surfaces of the container, the metallic resistance is placed entirely within its walls. Such arrangement will in no way affect the reflecting qualities of container, which will function in the usual manner of heat preserving containers.

The invention will appear more clearly from the following detailed description when taken in connection with accompanying drawings showing, by way of example only, preferred embodiments of the inventive idea.

In the drawings:

Figure 2 is a section along the line 2—2 of Figure 1.

Figure 3 is a section through a somewhat differently constructed device.

Figure 4 is a section through another modification of the inventive idea.

Figure 5 is a section through a differently constructed device.

Figure 1:
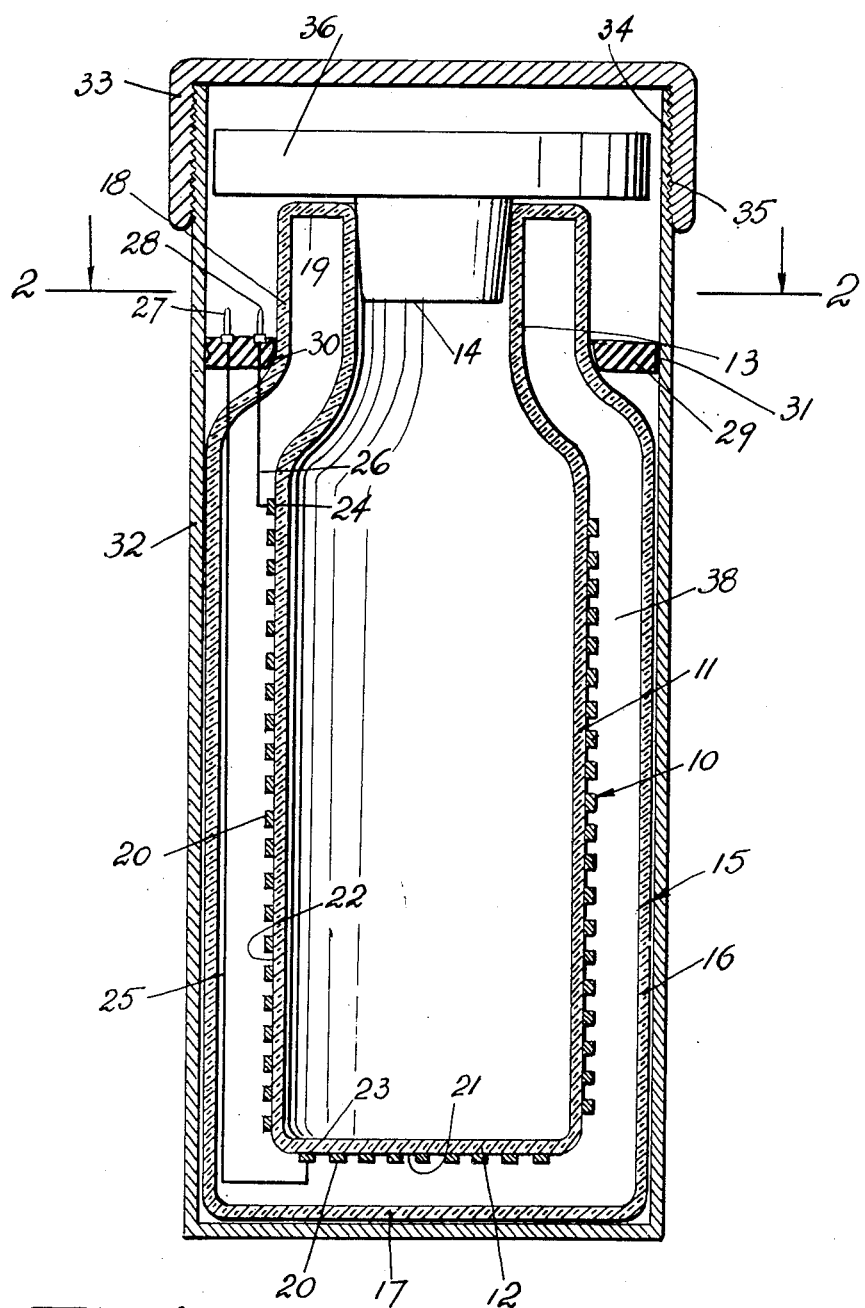
Figure 1 is a vertical section through a container constructed in accordance with the principles of the present invention.

The glass bottle shown in Figures 1 and 2 of the drawings serves the double purpose of heating the liquid or semi-liquid substance stored therein and of preserving their heat. The device includes an inner container 10 having side walls 11, a bottom 12 and a neck 13 which may be closed by a cork or closure 14.

The container 10 is enclosed by another container 15 which is located at a distance therefrom and has side walls 16, a bottom 17 and a neck portion 18 joined to the neck 13 of the inner container 10 by a portion or web 19. The inner chamber 38 between the two containers may be evacuated.

A metallic resistance 20 having the form of a continuous strip or band is applied upon the outer surface 21 of the bottom 12 and the outer surface 22 of the side walls 11 of the container 10; the surfaces 21 and 22 being directed toward the space between the inner and outer containers.

The resistance 20 has two ends 23 and 24, which are connected by wires 25 and 26 to prongs 27 and 28, respectively.

The prongs 27 and 28 are carried upon a disc 29 which consists of an insulating material, such as fibre, synthetic resin or the like.

The inner surface 30 of the annular disc 29 engages the neck of the outer container 15 while the outer surface 31 of the disc presses against a cylindrical envelope 32 which encloses the bottle in its entirety. The cylinder 32 is closed by a cover 33 provided with inner screw threads 34 which can mesh with outer screw threads 35 provided upon the outer end of the cylinder 32.

The closure 14 carries a disc 36 which extends above the webs 19 and over the prongs 27 and 28, so that it is not possible to reach these prongs and to apply electrical current thereto without removing the closure. This arrangement is advantageous in that it makes it impossible to heat the resistance 20 while the container is closed, so that the heating of the substances within the container cannot be carried to a point where the danger of explosion or breakage may arise.

The construction shown in Figure 3 illustrates a container 40 carrying a plurality of strips 41 which are insulated electrically one from the other and which can be interconnected in series or in parallel or attached separately to the electrical circuit by means of a switch 42 for the purpose of regulating the intensity of heating. The strips 41 are quite wide so that they cover a large portion of the walls 43 of the container.

The strips 41 have a light-reflecting surface 44 directed toward the interior 45 of the container. The provision of the switch 42 is particularly advantageous in the case of containers used for industrial purposes.

Figure 4 illustrates a container 50 having side walls 51. Resistors 52 are embedded in the walls 51. In other respects the container is similar to those described.

The wall 51 may be made reflectant by having a surface 53 which reflects toward the interior 54 of the container. The outer container 55 has an outer surface 56 directed toward the exterior of the container.

Figure 5 shows a container 60 having a side wall 61 a portion of which is provided with a silver coating 62 so that the reflectant surface is directed toward the interior 63 of the container, the heating strip 64 is located upon a layer 65 of insulating varnish which covers the coating 62, thereby avoiding short circuit. Figure 5 also illustrates the arrangement of a heating strip 66 upon an inner surface 67 of the container.

This construction may be used only when the substances filling the container are poor conductors of electricity.

It is apparent that the described constructions illustrate bottles or the like which can serve most conveniently not only to preserve the heat of semi-liquid or liquid condiments or other substances contained therein, but also for heating these contents to a desired temperature.

It is also apparent that the principles of the present invention are capable of other domestic and industrial applications. In general, the examples shown above have been given by way of illustration and not by way of limitation and are subject to wide variations and modifications within the scope of the present invention.

All such variations and modifications are to be included within the scope of the present invention.

What is claimed is:

1. As an article of manufacture, a combined heating and heat-preserving receptacle, comprising an inner container, an outer container enclosing said inner container and extending at a distance therefrom, said containers consisting of glass, means interconnecting said containers and forming a closed chamber therebetween, said chamber being evacuated by air, and electric heating means carried by said inner container, and consisting of a plurality of continuous bands composed of particles of molten and pulverized metal and located upon a surface of said inner container, said inner container having a reflecting surface directed toward the interior of the container, and said outer container having a reflecting surface directed toward the exterior of the container.

2. As an article of manufacture, a combined heating and heat-preserving receptacle, comprising an inner container, an outer container enclosing said inner container and extending at a distance therefrom, said containers consisting of glass, means interconnecting said containers and forming a closed chamber therebetween, said chamber being evacuated of air, and electric heating means carried by said inner container and consisting of at least one continuous band composed of particles of molten and pulverized conducting metal located in recesses formed in the walls of said inner container.

ENZO DEL BUTTERO.

REFERENCES CITED

The following references are of record in the file of this patent:

UNITED STATES PATENTS

| Number | Name | Date |
| --- | --- | --- |
| 1,378,256 | Malhomme | May 17, 1921 |
| 1,574,581 | Kay | Feb. 23, 1926 |
| 1,621,758 | Shaw | Mar. 22, 1927 |
| 2,024,454 | Justheim | Dec. 17, 1935 |
| 2,119,680 | B. Long | June 7, 1938 |